(12) United States Patent
Selignan

(10) Patent No.: US 7,877,785 B2
(45) Date of Patent: Jan. 25, 2011

(54) METHOD OF PROVIDING A GUEST TERMINAL WITH EMERGENCY ACCESS TO A WLAN

(75) Inventor: Anne-Laure Selignan, Strasbourg (FR)

(73) Assignee: Alcatel Lucent, Paris (FR)

( * ) Notice: Subject to any disclaimer, the term of this patent is extended or adjusted under 35 U.S.C. 154(b) by 950 days.

(21) Appl. No.: 11/697,288

(22) Filed: Apr. 5, 2007

(65) Prior Publication Data

US 2008/0016556 A1 Jan. 17, 2008

(30) Foreign Application Priority Data

Apr. 29, 2006 (EP) ................... 06360015

(51) Int. Cl.
*H04M 11/04* (2006.01)
(52) U.S. Cl. ............... 726/3; 379/37; 379/45
(58) Field of Classification Search .............. 379/45
See application file for complete search history.

(56) References Cited

U.S. PATENT DOCUMENTS

| | | | | |
|---|---|---|---|---|
| 7,177,399 | B2 * | 2/2007 | Dawson et al. | 379/45 |
| 7,433,673 | B1 * | 10/2008 | Everson et al. | 455/404.1 |
| 7,496,182 | B2 * | 2/2009 | Coster et al. | 379/45 |
| 2004/0066756 | A1 | 4/2004 | Ahmavaara et al. | |
| 2004/0181692 | A1 | 9/2004 | Wild et al. | |
| 2005/0185626 | A1 | 8/2005 | Meier et al. | |
| 2006/0030290 | A1 * | 2/2006 | Rudolf et al. | 455/404.1 |
| 2006/0068799 | A1 | 3/2006 | Morton et al. | |
| 2006/0078123 | A1 | 4/2006 | Bichot et al. | |
| 2006/0274729 | A1 * | 12/2006 | Self | 370/352 |
| 2007/0238448 | A1 * | 10/2007 | Gallagher et al. | 455/414.2 |

OTHER PUBLICATIONS

Salkintis, Apostolis K., "Evolving Public Safety Communication Systems by Integrating WLAN and TETRA Networks", Jan. 2006, IEEE Communications Magazine, pp. 38-46.*

* cited by examiner

*Primary Examiner*—Matthew B Smithers
(74) *Attorney, Agent, or Firm*—Fay Sharpe LLP

(57) ABSTRACT

The invention concerns a method of providing a terminal (10) with an emergency access over a WLAN (2) to a LAN (3), and a communication system (1) to execute this method. The LAN (3) comprises one or more access points (20) and an access control function (21) which admits data packets from users of the WLAN (2) associated with a first SSID to the LAN (3). One or more emergency SSIDs dedicated to allow access to the LAN (3) in an emergency case are defined. An emergency call is initiated by sending data packets from the terminal (10) associated with a selected emergency SSID to one of the one or more access points (20). The access control function (21) admits the data packets from the terminal (10) associated with the selected emergency SSID to the LAN (3). The data packets from the terminal (10) associated with the selected emergency SSID are routed, after admission to the LAN (3), to an emergency answering point (60).

28 Claims, 11 Drawing Sheets

METHOD OF PROVIDING A GUEST TERMINAL WITH EMERGENCY ACCESS TO A WLAN

TECHNICAL FIELD

The present invention relates to a method of providing a terminal with an emergency access over a wireless LAN (=WLAN), and a communication system to execute said method (LAN=Local Area Network). The invention is based on a priority application EP 06 360 015.9 which is hereby incorporated by reference.

BACKGROUND OF THE INVENTION

WLANs are becoming increasingly popular access networks, both in public areas such as hotels, airports, train stations, conference facilities, as well as in proprietary areas such as in company buildings. Corporations install WLANs on their premises to allow freedom of movement to their personnel while providing a relatively high bandwidth compared with legacy wireless networks such as GSM (=Global System for Mobile Communication).

Another development of the past years has been the growing use of IP-based data networks for the transmission of real-time data such as voice and video (IP=Internet Protocol). Several standards dealing with VoIP applications have been introduced, such as the codec standards G.711 and G.729, and the transmission protocol RTP (VoIP=Voice over IP; codec=encoding/decoding; RTP=Real-Time Transport Protocol).

Until recently, subscribers used a WLAN network for non-realtime applications, only, e.g., to connect their browser to the Internet. However, today's WLANs are challenged with the task to handle also real-time applications, e.g., VoWLAN (=Voice over WLAN). After all, subscribers of a VoWLAN solution expect the same voice quality, reliability and functionality as with their legacy PSTN (=Public Switched Telephone Network) telephone or GSM mobile phone.

SUMMARY OF THE INVENTION

It is the object of the present invention to grant a guest terminal access to telecommunications services for emergency purposes.

The object of the present invention is achieved by a method of providing a terminal with an emergency access over a WLAN to a LAN comprising one or more access points and an access control function which admits data packets from users of the WLAN associated with a first SSID to the LAN, whereby the method comprises the steps of defining one or more emergency SSIDs dedicated to allow access to the LAN in an emergency case, initiating an emergency call by sending data packets from the terminal associated with a selected emergency SSID to one of the one or more access points, and admitting, by the access control function, the data packets from a terminal associated with the selected emergency SSID to the LAN (SSID=Service Set Identifier).

The association of a terminal with a SSID means that the terminal notifies within the communication over the air interface of the WLAN said SSID. Preferably, the SSID is notified within the MAC layer part of the communication over the air interface. That means that the terminal signalizes during the communication over the air interface an SSID to the access point, the SSID that is associated with the terminal.

In a preferred embodiment of the present invention, the data packets from the terminal associated with the selected emergency SSID are routed, after admission to the LAN, to an emergency answering point.

The present invention presents a simple method how to provide a terminal—both a guest terminal and an authorized terminal—with a reliable and secure access over WLAN to a LAN in the case of an emergency.

A user of a mobile terminal is not limited to publicly accessible LANs for establishing an emergency call but may also use corporate or proprietary LANs, e.g., a corporate campus network. Thus, even a guest terminal which normally would be unauthorized to access a network with restricted access rights can set up an emergency call via the network.

Moreover, the present invention significantly contributes to the future acceptance of the VoWLAN technology since the present invention provides a WLAN with means to offer connectivity and reliability in case of an emergency. In the USA, the Federal Communications Commission (=FCC) requires providers of VoIP services to ensure that all interconnected VoIP calls provide full 9-1-1 capability whereby 9-1-1 is the official national emergency number in the USA and Canada. Similar requirements are discussed in many European countries where the official national emergency number is 1-2-2, for example. By means of the presented invention, any caller dialing the central emergency number 9-1-1 and/or 1-2-2 can be sure to be dependably transferred to a PSAP (=Public Safety Answering Point) from which help will be organized. For the routing of data packets related to the emergency call, a variety of methods is available. Therefore, an appropriate method can be chosen in dependence of the actual situation and the circumstances such as available infrastructure, traffic load, etc.

Further advantages are achieved by the embodiments of the invention indicated by the dependent claims.

According to another preferred embodiment of the invention, the terminal wishing to initiate an emergency call may receive, by means of a DHCP inquiry, a destination address where to send the corresponding data packets (DHCP=Dynamic Host Configuration Protocol). Therefore, the terminal addresses the data packets from the terminal associated with the selected emergency SSID with the destination address received via the DHCP request.

The DHCP concept may be realized by means of a DHCP server which preferably is implemented as a daemon and waits on UDP port 67 for client requests (UDP=User Datagram Protocol). A configuration file of the DHCP server comprises information about the address pool to be distributed as well as additional data about network-relevant parameters. Therefore, a terminal with often changing locations may dispense with an error-prone pre-configuration. The terminal simply establishes a connection to the WLAN and requests all relevant parameters from the DHCP server.

Then the data packets from the terminal associated with the selected emergency SSID are sent by the terminal to the IP address and the port of a call manager which will route the data packets related to the emergency call to a PSAP. Preferably, the terminal receives the address-related data of the call manager from the DHCP server.

Preferably, the terminal requests a particular DHCP option that will provide the terminal with a destination address, e.g., an IP address of the call manager. The terminal may send a message associated to the DHCP method to a DHCP server to ask for a destination address where to send the data packets of the emergency call. After reception of the destination address from the DHCP server, the terminal associated with the selected emergency SSID sets the received IP address as destination address of the data packets from the terminal associated with the selected emergency SSID. Preferably, the destination address comprises the IP address of the call manager and a port the call manager is listening on.

According to another preferred embodiment, the terminal associated with the selected emergency SSID addresses the data packets from the terminal associated with the selected emergency SSID with an arbitrary IP address. On arrival at an AP of the WLAN, a NAT function associated with the AP modifies the address of the data packets to a predetermined destination address (AP=Access Point). The data packets associated with the selected emergency SSID are redirected in the WLAN infrastructure to a destination address by using a destination NAT (=Network Address Translation). NAT is a method in IP networks to substitute a first IP address in a data packet with another IP address. For example, the data packets associated with the selected emergency SSID are redirected by the NAT function to a destination address of the call manager.

According to still another preferred embodiment, the data packets from the terminal associated with the selected emergency SSID are addressed with a predetermined multicast address. This may be done at the terminal or, upon entering the WLAN, by a network node, e.g., at the AP. Preferably, the multicast address is the multicast address of a multicast group the call manager has joined and comprises a predefined port on which the call manager is listening.

Preferably, the destination address of the RTP flow is the multicast address of a multicast group the call manager has joined. Hence, all network devices should support multicast. Once the terminal is associated to a specific emergency SSID, it may register to a multicast group and then initiate a RTP flow depending on the SSID it has chosen that will determine the voice encoding/decoding (=vocoder) and framing. The call manager receives the data packets directly without any kind of signalling, i.e., the route of data packets from the terminal associated with an emergency SSID is pre-set and a connection is pre-established. The data packets related to the emergency call are routed to a PSAP, possibly through a conventional telephone network such as a PSTN.

In another preferred embodiment, the call signalling according to the present invention is compliant with all types of call handling clients like SIP, H.323, etc (SIP=Session Initiation Protocol). The present method is totally protocol agnostic. The terminal only has to send RTP packets to the call manager. There is no codec nor framing negotiation. The call manager always listens for an emergency service request on a specific port. Preferably, the call manager receives the data packets from the terminal associated with the selected emergency SSID via a pre-established link and routes the data packets related to the emergency call to an emergency answering point. The data packets, e.g., RTP packets, are transmitted through the LAN and the associated networks independently of a specific signalling scheme without coding or decoding and without framing negotiation.

According to a preferred embodiment of the invention, data packets from a terminal associated to an emergency SSID are routed, once they have been admitted to a LAN network, to an emergency service or an emergency answering point, e.g., a PSAP. Preferably, the routing is executed by PBX or the call manager. Once the call manager receives an emergency call, the call manager establishes a call regarding the geographic area of the originating call. All data packets from a terminal associated to an emergency SSID which enter the LAN are routed to the emergency service or the emergency answering point, preferably independently of the originally indicated destination address of the data packets. Data packets from a terminal associated to an emergency SSID are granted access to the LAN only for the purpose of establishing an emergency call.

In line with the invention, said LAN may be a LAN accessible via two or more WLANs. Each of the WLANs may serve as an access network to the LAN environment and be associated with a separate SSID. Then, the LAN may be accessible via a first WLAN by means of a first SSID, e.g., a normal SSID, and accessible via a second WLAN by means of a second SSID, e.g., an emergency SSID.

Correspondingly, the invention also presents a method of providing access to a LAN accessible via at least two WLANs, for a number of user terminals comprising terminals of authorized users, e.g., users belonging to a corporation, as well as terminals of guest users. Said first WLAN provides access to the LAN for data packets associated with a first SSID. Data packets from the first WLAN are filtered using an encryption method to allow only properly encrypted data packets from terminals of authorized users to the LAN and discard data packets from other terminals. Furthermore, at least one second WLAN provides access to the LAN for data packets originating from terminals of all users and associated with a second SSID. Data packets from the second WLAN are filtered to allow only data packets carrying VoIP emergency calls.

As clients associated to an emergency SSID can be guest users, encryption or authentication cannot be set. To prevent attacks to or unauthorized use of the emergency SSID, several security means can be set. According to a preferred embodiment of the invention, a bandwidth contract per user may be accepted. Packets will be dropped if the client sends more packets than the allowed bandwidth. According to another preferred embodiment of the invention, with destination NAT, one can be sure that the destination address of the packets is the call manager IP address. This prevents clients to send packets to other devices. The presence of a device that is able to filter packets according to the protocol, the service, the used bandwidth, or the source or destination IP address of the data packets to be filtered will allow only voice communication.

According to another preferred embodiment of the invention, the access to the WLAN is restricted to data packets from a terminal associated with the first SSID, i.e., data packets originating from authorized users of the WLAN, and data packets from a terminal associated with an emergency SSID broadcast by an AP of the WLAN. The access restrictions may be enforced by applying firewall rules and/or by the use of an access control list (=ACL) and/or a private virtual local area network (=PVLAN). It is also possible that the access control function only admits voice traffic to the WLAN.

An important information to have in an emergency service is the localization of a user initiating an emergency call. With the help of a DHCP tracker and the use of web services hosted at a localization server, this information can be transmitted to the PSAP.

The object of the present invention is further achieved by a method of localizing a terminal with an emergency access over a WLAN to a LAN comprising one or more access points and an access control function which admits data packets from users of the LAN associated with a first SSID to the LAN, whereby the method comprises the steps of defining one or more emergency SSIDs dedicated to allow access to the LAN in an emergency case, initiating an emergency call by sending data packets from the terminal associated with the selected emergency SSID to one of the one or more access points, admitting, by the access control function, the data packets from the terminal associated with the selected emergency SSID to the LAN, and transmitting localization information about the location of the terminal to a call manager.

In a preferred embodiment, the terminal sends a SOAP message with the localization information to a localization server or the call manager (SOAP=Simple Object Access Protocol). If the SOAP message with the localization information is sent to the localization server, the localization information has to be transferred to the call manager. This may be done by the call manager polling the localization server to provide the localization information or by the localization server pushing the localization information to the call manager after receiving the localization information from the terminal.

According to another preferred embodiment, the terminal sends a DHCP renew message with the localization information to a DHCP server. Then, the DHCP server sends a SOAP message with the localization information to the localization server or the call manager. Again, if the SOAP message with the localization information is sent to the localization server, the localization information has to be transferred to the call manager. This may be done by the call manager polling the localization server to provide the localization information or by the localization server pushing the localization information to the call manager after receiving the localization information from the terminal.

In a preferred embodiment, specific emergency SSIDs for emergency calls are defined, together with specific capabilities such as codecs. Each of the defined emergency SSIDs is associated with different capabilites, e.g., with a different codec. Hence, several emergency SSIDs can be configured depending on parameters that will be used for the call, e.g., one emergency SSID for G.711 and another emergency SSID for G.729. The user of the terminal or the intelligence of the terminal may select an emergency SSID dependent upon the associated capabilities. Information about the capabilities associated with a specific emergency SSID may be extracted from the broadcast of an emergency SSID. The information about the capabilities may be contained in the SSID itself or may be retrieved from a separate information element of the LAN. The call manager receives information about the processing of the data packets in the RTP header.

Preferably, an emergency call is initiated by sending data packets associated to a Voice over WLAN telephone call. VoWLAN enables VoIP in a mobile environment. It relies on IEEE 802.11-based WLANs, mostly within buildings. VoWLAN comprises the integration of approaches such as VoIP based on call signalling protocols such as SIP or H.323, and WLAN according to IEEE 802.11 in the version of 802.11e which supports Quality of Service (=QoS). In addition, a direct connection to UMTS networks is possible and hence the expansion of VoWLAN services out of the scope of radio-based LANs.

According to another preferred embodiment of the invention, the terminal uses a 802.11e or WMM method to indicate that the data stream related to the emergency call has a voice emergency priority (WMM=WiFi Multi-Media; WiFi=Wireless Fidelity). Admission control of calls to a network is negotiated by the use of TSPEC (=Traffic Specification). A station, here the terminal, specifies its traffic flow requirements (data rate, delay bounds, packet size, and others) and requests a QAP (=QoS Access Point) to create a TSPEC by sending the ADDTS (=add TSPEC) management action frame. The QAP calculates the existing load based on the current set of issued TSPECs. Based on the current conditions, the QAP may accept or deny the new TSPEC request. If the TSPEC is denied, the high priority access category inside the QoS Station (=QSTA) is not permitted to use the high priority access parameters, but it must use QoS level parameters instead.

Moreover, preemption can be used to favour an emergency call. When a user of the terminal dials a priority number such as an emergency number, the calling party may expect the WLAN to process the urgent call with a higher priority than a normal subscriber conversation. The AP and/or the call manager recognize the priority status of the emergency call and preempt resources allocated to calls of lower priority than the emergency call in favour of the emergency call. Generally, the preemption and TSPEC mechanisms may be used to guarantee a specific QoS to the data packets associated with an emergency call. Preferably, the terminal comprises a display unit, e.g., a screen, where a specific symbol, e.g., the letters "SOS" or an icon depicting a police patrol light, can be displayed on a softscreen or a dial pad when the terminal detects that an emergency SSID is available. Alternatively, an acoustic signal, e.g., a jingle or a specific sound, is replayed from a loudspeaker of the terminal in the case that an emergency SSID is available. A data file comprising the specific icon or sound may be stored in a memory of the terminal and may be retrieved from the memory and outputted at the terminal to inform a user of the terminal that an emergency access to the WLAN is available.

According to another preferred embodiment of the invention, at least one of the one or more access points broadcast the one or more emergency SSIDs. The terminal detects at least one of the one or more broadcast emergency SSIDs and selects an emergency SSID from the at least one detected emergency SSID.

The object of the present invention is further achieved by a communication system for providing a terminal with an emergency access over a WLAN to a LAN, the communication system comprising an access control function which admits data packets from authorized users of the WLAN carrying a first SSID to the LAN, that the communication system comprises an interface adapted to receive data packets from the terminal associated with an emergency SSID selected from the at least one detected emergency SSID, a control unit adapted to forward the received data packets from the terminal associated with the selected emergency SSID to the access control function, whereby the access control function admits the data packets from the terminal associated with the selected emergency SSID to the LAN, and that the communication system is adapted to route the data packets associated with the selected emergency SSID, after admission to the WLAN, to an emergency answering point.

Preferably, the communication system is adapted to route the data packets from a terminal associated with the selected emergency SSID when the data packets have been addressed at the terminal with a destination address received at the terminal via a DHCP request.

According to another preferred embodiment, the communication system further comprises a NAT function adapted to redirect the data packets from a terminal associated with the selected emergency SSID in the WLAN infrastructure to a predetermined destination address, e.g., an IP address of a call manager.

According to still another preferred embodiment, the communication system routes the data packets from a terminal associated with the selected emergency SSID when the data packets have been addressed at the terminal with an IP address of a call manager as destination address whereby said IP address is a multicast address.

The object of the present invention is further achieved by a communication system for providing a terminal with an emergency access over a WLAN to a LAN, the communication system comprising an access control function which admits data packets from authorized users of the WLAN carrying a first SSID to the LAN, that the communication system comprises an interface adapted to receive data packets from the terminal associated with an emergency SSID selected from the at least one detected emergency SSID, a control unit adapted to forward the received data packets from the terminal associated with the selected emergency SSID to the access control function, whereby the access control function admits the data packets from the terminal associated with the selected emergency SSID to the LAN, and a call manager adapted to constantly listen for an emergency request on an emergency-specific port.

Moreover, the object of the present invention is further achieved by a communication system for providing a terminal with an emergency access over a WLAN to a LAN, the communication system comprising an access control function which admits data packets from authorized users of the WLAN carrying a first SSID to the LAN, that the communication system comprises an interface adapted to receive data packets from the terminal associated with an emergency SSID selected from the at least one detected emergency SSID, a control unit adapted to forward the received data packets from the terminal associated with the selected emergency SSID to the access control function, whereby the access control function admits the data packets from the terminal associated with the selected emergency SSID to the LAN, and that the access control function is adapted to restrict the access to the LAN to data packets from the terminal associated with the selected emergency SSID with regard to service and/or bandwidth and/or destination.

Also, the object of the present invention is achieved by a communication system for localizing a terminal with an emergency access over a WLAN to a LAN, the communication system comprising an access control function which admits data packets from authorized users of the WLAN carrying a first SSID to the LAN, that the communication system comprises an interface adapted to receive data packets from the terminal associated with an emergency SSID selected from the at least one detected emergency SSID, a control unit adapted to forward the received data packets from the terminal associated with the selected emergency SSID to the access control function, whereby the access control function admits the data packets from the terminal associated with the selected emergency SSID to the LAN, and a localization server and/or a call manager adapted to receive localization information of the terminal and forward data related to the localization information to an emergency answering point.

Preferably, the communication system further comprises a sender adapted to broadcast one or more emergency SSIDs dedicated to allow access to the LAN in an emergency case to the terminal.

DESCRIPTION OF THE DRAWINGS

These as well as further features and advantages of the invention will be better appreciated by reading the following detailed description of presently preferred exemplary embodiments taken in conjunction with accompanying drawings of which.

BRIEF DESCRIPTION OF PREFERRED EMBODIMENTS

Figure 1:
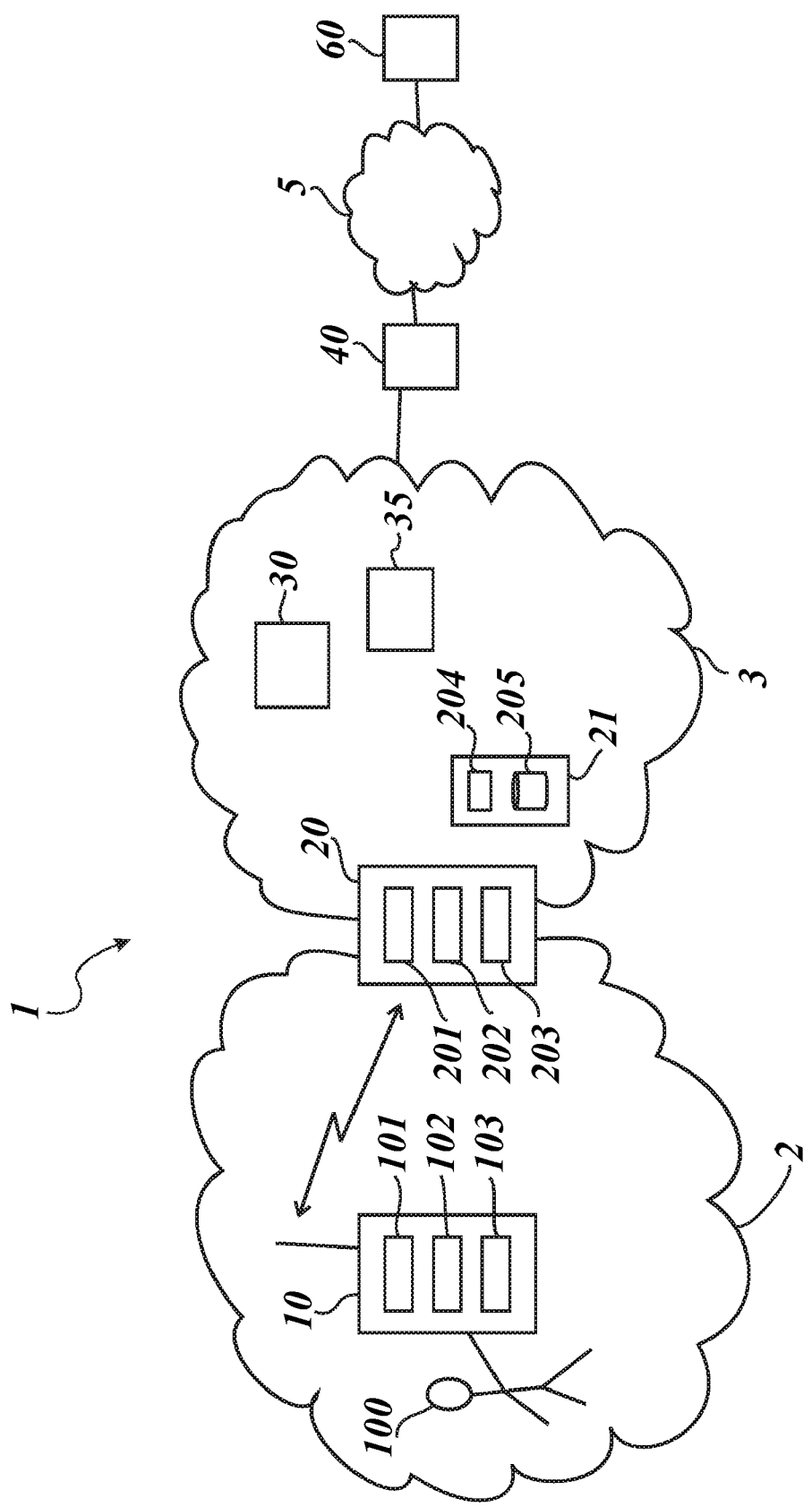
FIG. 1 is a block diagram of a terminal accessing a LAN according to an embodiment of the invention.

FIG. 1 shows a communication system 1 comprising a WLAN 2, a LAN 3, a network 5, a call manager 40, and a PSAP 60. A user 100 of a terminal 10 wants to get connected through an emergency call to a PSAP 60. The terminal 10 is located within the coverage area of an access point 20 which belongs to the LAN 3. The LAN 3 further comprises an access control function 21, a DHCP server 30, a localization server 31, and a call manager 40. The network 5 connects the call manager 40 and the PSAP 60. The second network 5 may be ordinary telephone network, such as a PSTN network.

The terminal 10 may be a mobile device for establishing a telecommunication call via an access network. It may be, e.g., a mobile telephone or a laptop computer comprising a VoIP client with a WLAN interface. The terminal 10 comprises a detection unit 101, a control unit 102 and a user interface 103. The user interface 103 comprises means to enable the user 100 to provide the terminal 10 with input and to receive output from the terminal 10. Preferably, the user interface 103 comprises a keypad with input keys, a microphone, a display and a loudspeaker.

The access point 20 of the LAN 3 is a hardware device or a computer software that acts as a communication hub for the terminal 10 to connect to the WLAN 2. The AP 20 comprises a sender 201, an interface module 202 with an interface to the WLAN 2 and an interface to the LAN 3, and a control unit 203. The interface to the WLAN 2 is able to send and receive, i.e., to exchange, data with terminals of the WLAN, the interface to the LAN 3 is able to send and receive, i.e., to exchange, data with network elements of the LAN 3.

The sender 201 broadcasts one or more emergency SSIDs dedicated to enable access to the LAN 3 in an emergency case. The interface 202 receives data packets sent by the terminal 10 via the air interface to the LAN 3. The control unit 203 provides control and intelligence function to the access point 20.

The WLAN 2 may be represented by the terminals within the coverage area of the sender, the interface to the WLAN 2, and the medium carrying the data exchange between the terminals and the interface to the WLAN 2, i.e., the air interface.

A SSID identifies a radio network based on IEEE 802.11. The SSID, also known as network name because essentially it is a name that identifies a network, is a unique case-sensitive string of up to 32 alphanumeric characters. All wireless devices on a WLAN must employ the same SSID in order to communicate with each other. The SSID is configurated in an AP of a WLAN and is set by all clients which want to access the WLAN via the AP. The SSID on wireless clients can be set either manually, by entering the SSID into the client network settings, or automatically, by leaving the SSID unspecified or blank.

The access control function 21 provides an access control to the LAN 3. The access control function 21 may be realised as a WLAN controller, preferably as a stand-alone device, or may be integrated into the functionality provided by the AP 20 and/or the AP device. The access control function 21 comprises a control unit 204 for controlling the access control function 21 and applying, to data packets arriving at the borders of the WLAN 2, access control rules stored in a memory module 205. The access control function 21 filters arriving data packets before admitting them to the networks 2 and 3.

The WLAN 2 is connected to the DHCP server 30, the localization server 31, and the call manager 40 via the network 3 which is an IP network, e.g., a LAN or the Internet via a DHCP relay function. The DHCP server 30 assigns dynamic IP addresses to devices accessing the LAN 3. With dynamic addressing, a device can have a different IP address every time it connects to a network. In some systems, the IP address of an device can even change while it is still connected. DHCP also supports a mix of static and dynamic IP addresses.

The localization server 35 hosts services, preferably web services, to locate a position of the terminal 10. This may be achieved by extracting information from data received from the terminal 10. All information adapted to provide location data of the terminal 10 is summarized by the term "localization information". The localization information may be useful to locate the terminal 10.

The call manager 40 is responsible for managing an emergency call setup to the PSAP 60. The call manager 40 is composed of one or several interlinked computers, i.e., a hardware platform, a software platform basing on the hardware platform and several application programs executed by the system platform formed by the software and hardware platform. The functionalities of the call manager 40 are provided by the execution of these application programs. The application programs or a selected part of these application programs constitute a computer software product providing a call managing service as described in the following, when executed on the system platform. Further, such computer software product is constituted by a storage medium storing these application programs or said selected part of application programs.

Figure 2:
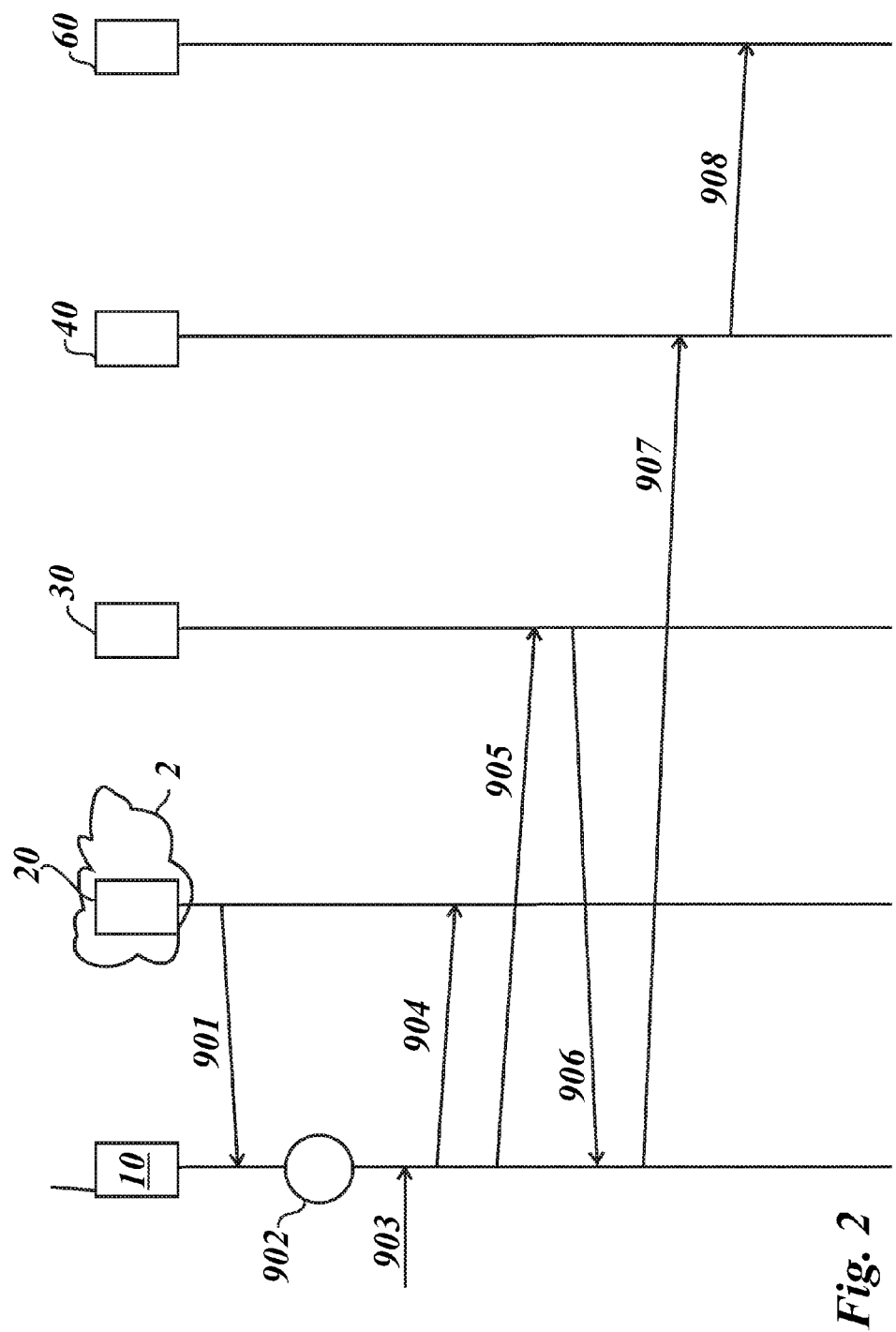
FIG. 2 is a message flow sequence showing a terminal accessing a LAN according to an embodiment of the invention.

FIG. 2 shows a sequence of messages between the terminal 10, the access point 20 of the LAN 2, the DHCP server 30, the call manager 40 and the PSAP 60 according to a first embodiment of the invention. In a first step 901, two emergency SSIDs dedicated to an emergency service are broadcast by the AP 20 in a way that the terminal 10 can detect the emergency SSIDs by means of a detection unit. After detection of the broadcast emergency SSIDs by the terminal 10, an icon pattern is displayed on a display unit of the terminal in action 902 to inform a user of the terminal 10 that the emergency service is available at the present location. Alternatively, the user may be informed about the availability of the emergency service by means of any informing mechanism To request the indicated emergency service, the user of the terminal 10 can, in step 903, dial, on a keypad of the terminal 10, an emergency service number associated with an emergency service, e.g., the number 9-1-1 in North America or the number 1-1-2 in Europe, or press a soft key dedicated to the emergency service on the terminal 10. The soft key is a key below the terminal's main display panel that performs special functions.

Triggered by the action 903, the terminal 10 selects an emergency SSID from the set of detected emergency SSIDs. Alternatively, the user of the terminal is prompted to choose an emergency SSID according to his preferences and indicate his choice by inputting via a key. Correspondingly, the terminal 10 associates to the selected emergency SSID in step 904.

The codec used for the emergency call may be G.711, according to the selected emergency SSID. If the terminal 10 originally was associated to another SSID, the terminal 10 should de-associate from the former SSID and associate with the emergency SSID. In a next step 905, the terminal 10 sends a DHCP DISCOVER message, to the DHCP server 30.

The DHCP server 30 replies to the DHCP request with a message 906, e.g., a DHCP OFFER message, sent to the terminal 10 wherein the message 906 comprises an IP address and port of the call manager 40 and an IP address of the terminal 10. The terminal may choose the offer, send another request to the DHCP server and receive an acknowledgment message. Thus, the terminal 10 is enabled to send an RTP flow 907 comprising data packets in G.711 codec standard to the specified destination, viz., the call manager 40. As the sent data packets of the RTP flow 907 are associated with the selected emergency SSID, the access control function 21 lets them pass.

All data packets entering the LAN 3 via the AP 20 must pass the access control function 21 which may be implemented as a dedicated stand-alone access control server. The access control server may be composed of one or several interlinked computers, i.e., a hardware platform, a software platform basing on the hardware platform and several application programs executed by the system platform formed by the software and hardware platform. The access control function 21 is provided by the execution of these application programs. The application programs or a selected part of these application programs constitute a computer software product providing an access control service as described in the following, when executed on the system platform. Further, such computer software product is constituted by a storage medium storing these application programs or said selected part of application programs.

It is also possible that the access control function 21 is implemented in a network element of the LAN 3 as an additional task, e.g., in a switch, exchange or router of the LAN 3. It is also possible that the access control function 21 is comprised within the AP 20. In case the access control function 21 is implemented in an conventional network element of the LAN 3, the access control function 21 may be comprised within a specific module that provides the access control functionality in cooperation with the other modules and units of the network element.

The access control function 21 reads the header of each arriving data packet, in particular the SSID comprised within the header, and checks whether the SSID is authorized with the LAN 3. For example, the access control function 21 is configured to admit all data packets associated with the first SSID used by authorized users if the LAN 3 and any of the broadcast emergency SSIDs. For this purpose, the access control function 21 may have stored in the memory 205 a data file comprising an access control list with a list of SSIDs that are approved. Then the access control function 21 looks up the access control list and compares the SSID of an arrived data packet with the SSIDs of said access control list. Depending on the result, the data packet is admitted to the LAN 3 or rejected. In a similar way, the ACL method mentioned above may be realized by means of the access control function 21.

Another way of controlling the access to the LAN 3 may be to allocate, by the access control function 21, a limited bandwidth to a client sending data packets associated with an emergency SSID. Preferably, the access control function 21 concludes a contract with every client sending data packets associated with an emergency SSID. This contract limits the bandwidth accepted from a client.

Thus, data packets sent by the terminal exceeding the allocated bandwidth are simply dropped by the access control function 21. This lessens the danger that a user utilizes his access to the WLAN for sending other data packets than data packets related to an emergency call.

The access control function 21 may also filter the data packets associated with an emergency SSID according to the protocol and the source IP addresses and the destination IP addresses used. For example, it is possible to allow only data packets carrying voice communication. In general, it is possible to filter the data packets with regard to service/protocol and/or bandwidth and/or source and/or destination.

The access control function 21 may also be implemented by means of a NAT function which performs an address translation of the destination IP addresses the data packets associated with an emergency SSID are set to. The NAT function may be implemented, e.g., in the control unit 204. Thus, it is able to modify the destination IP address of any data packet associated with an emergency SSID and arriving at the access control function 21 to a predetermined destination IP address, e.g., the IP address of a call manager. This prevents clients to send packets to other devices than emergency-related devices.

Apart from the terminal 10 being assigned an IP address by means of a DHCP solution, the terminal 10 may also receive an IP address by other methods known in the field of telecommunications networking.

The method by means of which the data packets associated to the emergency call are transmitted to the call manager 40 as a first station, is totally independent of the used protocol. To secure a reliable and fast transmission, all modifications that may be prone to errors such as encoding and decoding, framing, etc. is omitted. The data packets are simply transferred, e.g. as RTP packets, from the terminal 10 to the call manager 40 which always listens for an emergency service request on a specific port.

From the call manager 40, the data packets related to the emergency call are routed, via a PSTN network, to the PSAP 60. Therefore, the dialing 903 of an emergency service number quickly connects the terminal 10 to a dispatcher at a PSAP trained to route the emergency call to local emergency medical, fire, and law enforcement agencies.

At the PSAP call center 60, an operator verifies the caller's location, determines the nature of the emergency, and decides which emergency response teams should be notified. The emergency dispatcher uses location information provided by LBS to direct public safety personnel responding to the emergency to ensure the shortest possible emergency response time (LBS=Location Based Services). Sometimes a single primary PSAP will answer for an entire region. In most cases, the caller is transferred to a secondary PSAP from which help will be sent. Secondary PSAPs are sometimes located at fire dispatch offices, municipal police headquarters, or ambulance dispatch centers. Once the call is processed, the PSAP operator or dispatch center alerts the appropriate emergency response team, fire, rescue, police, dispatchers, etc.

Apart from the DHCP option, the infrastructure can use a destination NAT to redirect packets to the IP address and port of the call manager 40. NAT is an internet standard that enables a local area network to use one set of IP addresses for internal traffic and a second set of addresses for external traffic.

A NAT box located where the LAN meets the internet makes all necessary IP address translations. Here, the NAT serves mainly the purpose of providing a type of firewall by hiding internal IP addresses. When using destination NAT, the flow is forwarded to a host on a particular port, or the terminal 10 can send directly the RTP flow 907 to the call manager 40 using the DHCP option. All RTP flows are directed to his particular address on one port. Multiple sockets are created on one port. This is true for multicast or unicast sockets. A passive socket is not connected but rather awaits an incoming connection which will spawn a new active socket.

Since the terminal 10 is not known at the LAN 3 made accessible by means of the AP 20, it can use no encryption. However, there are several ways how to protect the LAN 3 from piracy and/or attacks.

The main security risk is the denial of service (=DoS). A DoS attack is an attack on a host (server) for the purpose to lame one or more of its services. Normally, this is achieved by overload. Typically, DoS attacks are not performed by hand but with a backdoor programme which independently proliferate to other hosts of a network. Thus, the attacker has additional hosts at his command for execution of his DoS attacks. On a 802.11 infrastructure such as the LAN 3, firewall rules can be applied to provide some protection against attacks. Only DHCP and RTP packets are flows are allowed to a specific host on the LAN 3. If other protocols are used, the user can be black-listed and cannot associate with the AP 20 during a configurable amount of time.

Alternatively, a DoS and Man-in-the-Middle (=MITM) detection and defense application can be implemented on the LAN 3. A MITM attack originates from an attacker who stands physically or logically in the middle of communications partners. At this position, the MITM-attacker has full control over the data traffic among the two or more network subscribers and can see or even manipulate the exchanged information at will.

Still another way of protecting the LAN 3 against attacks would be to provide only a limited bandwidth for users: This can help the system defending against DoS. It is further possible that the destination NAT is used to prevent the attack to be directed against other devices.

In still another embodiment, an association of all guest users may be used in a virtual local area network (=VLAN) dedicated to them in order to apply ACL per VLAN. A VLAN on a network is a broadcast domain. All of the hosts on that VLAN can communicate with the other members of the same VLAN. A private VLAN (=PVLAN) allows traffic to be segmented as the data link layer (layer 2) of the OSI model, limiting the size of the broadcast domain (OSI=Open Systems Interconnection). The ACL controls who receives a MAC/IP address access. An ACL is configured, for example, at a router which can exclude specific clients from access to the LAN 3 by means of their IP address. Protection against attacks can also be implemented on switches and routers. One possibility is to configure the PVLAN environment for layer 2 isolation. A PVLAN offer further subdivision within an existing VLAN, allowing individual ports to be separated from others while still sharing the same IP subnet. This allows separation between devices to occur without requiring a separate IP subnet for each device. In its simplest form, PVLANs support isolated ports and promiscuous ports. Isolated ports can talk only to promiscuous ports, while promiscuous ports can talk to any port. In this deployment, the members of a subnet are isolated ports, and the gateway device is connected to a promiscuous port. This enables the hosts on a subnet not to service the requests of members of the same subnet.

Another possibility would be the 802.1x private guest VLAN feature which extends a 802.1x guest VLAN to the PVLAN environment for layer 2 isolation. The 802.1x private guest VLAN offers limited network access through a guest secondary PVLAN to users without a 802.1x supplicant.

Another, rather straightforward, method would be to use an ACL technique or simply to restrict a maximum number of MAC addresses to individual VLANs on a trunk port.

The present invention supports several ways how to prevent inappropriate associations without harmful intention. For example, every terminal that associates to an emergency service SSID should send a TSPEC to require emergency within a certain amount of time, otherwise it is de-associated and/or blacklisted by the AP 20. Alternatively, the SSID can be hidden and an active scanning is mandatory to associate to the emergency SSID.

The emergency service call can be prioritized by triggering the terminal 10 to use a TSPEC traffic specification to indicate that the RTP flow has a voice emergency priority. It is also possible that a preemption procedure can be used to favor an emergency call with regard to lower-priority calls.

Figure 3A:
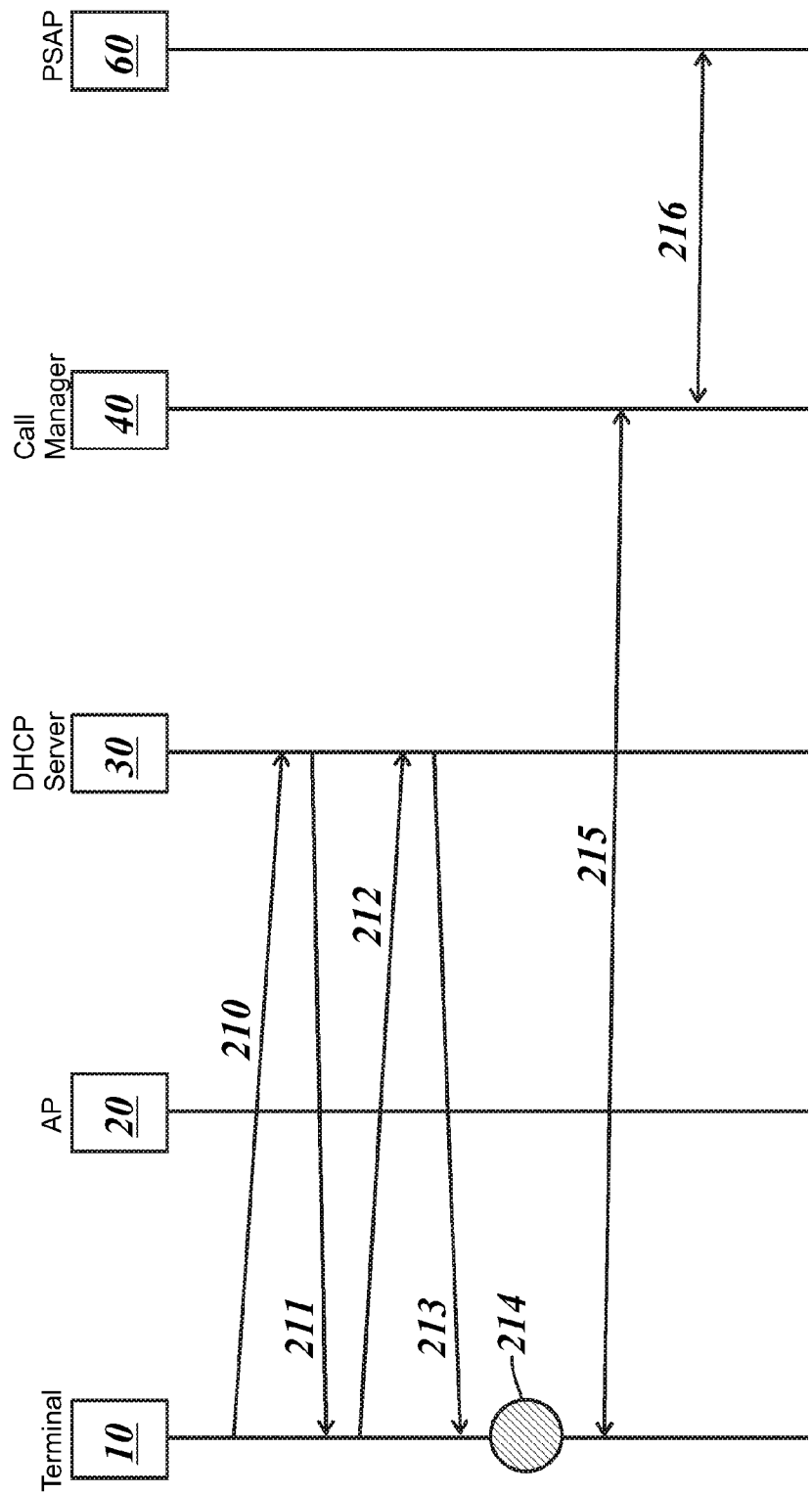
FIGS. 3a-c are message flow sequences showing routing options according to an embodiment of the invention.
Figure 3B:
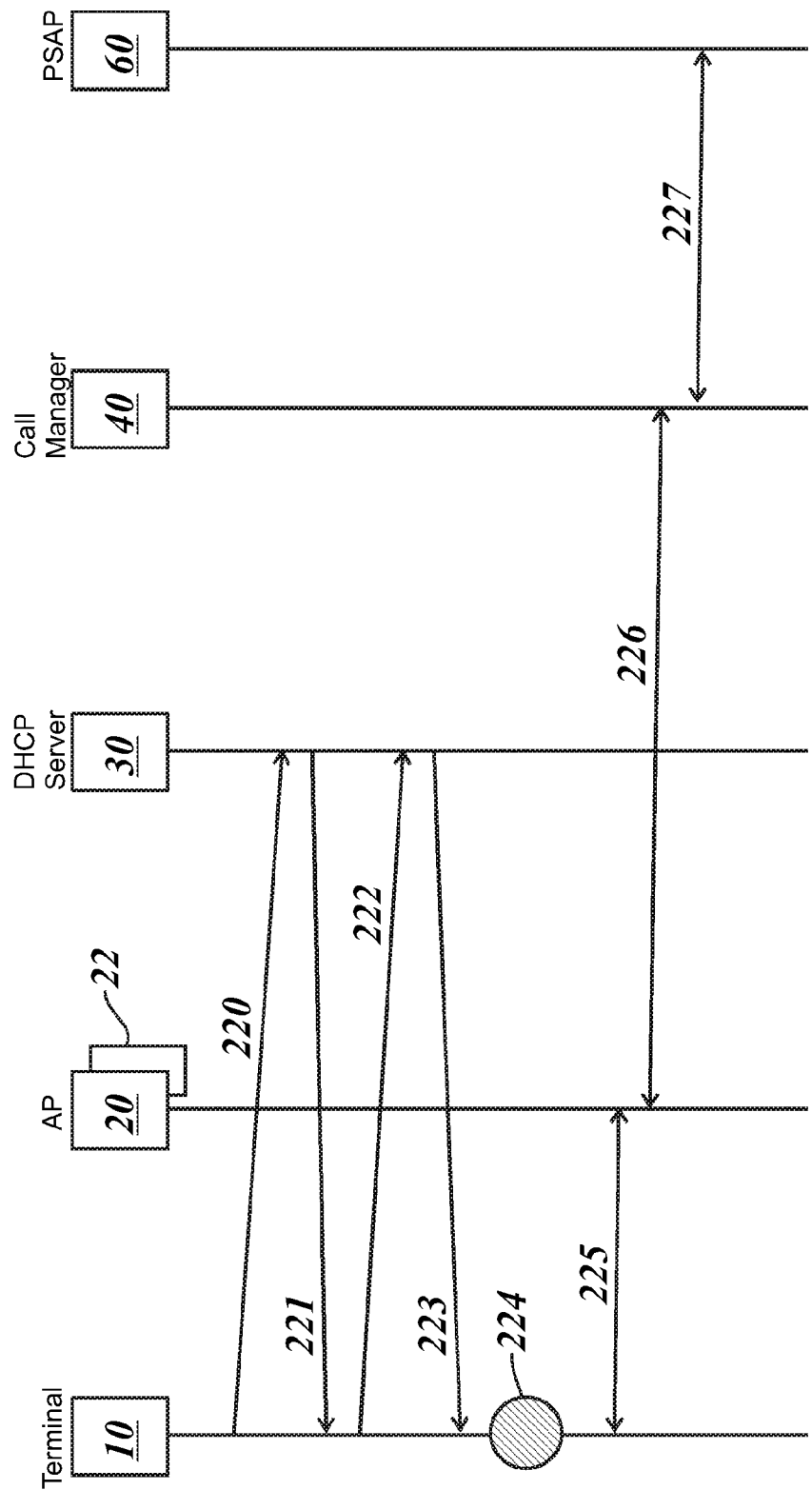
Figure 3C:
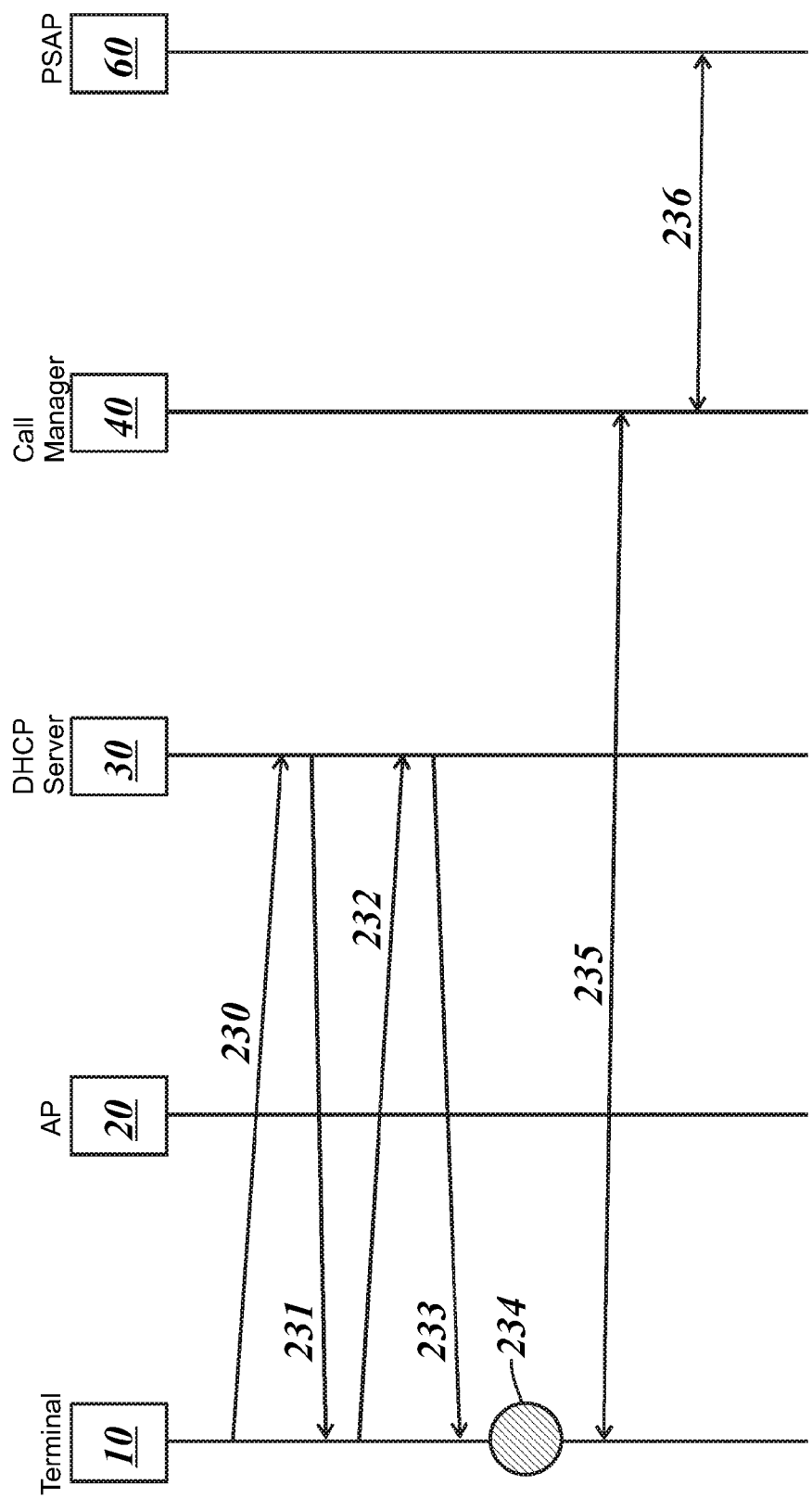

FIGS. 3a to 3c show three different examples related to the routing of packets of an emergency call. In each of the FIGS. 3a to 3c, a sequence of messages is transmitted between the terminal 10, the access point 20 of the LAN 3, a NAT server 22 associated with the access point 20, the DHCP server 30, the call manager 40 and the PSAP 60.

FIG. 3a shows a message flow sequence related to a packet routing based on a DHCP method. With this DHCP method, a client asks—when requesting an IP address—for a particular DHCP option that will give the client the call manager's IP address. In a first step of the method, the terminal 10 sends a DHCP DISCOVER message 210. For the terminal 10 being able to utilize the DHCP server 30, both devices have to be within the same IP network unless a DHCP relay is used. If both devices are not within the same IP network, a DHCP assistance device such as a DHCP relay unit or a DHCP helper unit may be used which relay and/or forward DHCP related messages to the network where the DHCP server is located.

The DHCP DISCOVER message 210 sent by the terminal 10 reaches the DHCP server 30. This may be achieved by sending the DHCP DISCOVER message 210 in broadcast if the terminal 10 and the DHCP server 30 are in the same network, e.g., VLAN, or via a DHCP helper. By means of the DHCP DISCOVER message 210, the terminal 10 requests an IP address from the DHCP server 30. Preferably, the DHCP DISCOVER message 210 comprises a MAC address of the terminal 10 (MAC=Media Access Control). The MAC address, also known as LAN address, Ethernet ID or airport ID, is the hardware address of a network device which serves for unique identification of the device in the network.

Preferably, the terminal 10 sends the DHCP DISCOVER message 210 as a network broadcast to all available DHCP servers. It is possible that several DHCP servers are located within the same IP subnetwork. The DHCP DISCOVER broadcast message 210 may carry as sender IP address 0.0.0.0 and may be addressed to the destination address 255.255.255.255, as the sending terminal 10 does not possess an IP address, yet, and directs the request to all reachable DHCP servers.

The DHCP server 30 receives the DHCP DISCOVER message 210 and replies with a DHCP OFFER message 211 which comprises an offer of an IP address for the requesting terminal 10. The DHCP OFFER message 211 further comprises a server ID identifying the sending DHCP server 30 and an IP address and a port of the call manager 40. It is possible that the terminal 10 receives more than one offer message from different DHCP servers. Thus, the terminal may choose between the received offers. After selecting one of the one or more proposed offers, the terminal contacts, by means of a DHCP REQUEST message 212, the appropriate DHCP server 30 which is identified by means of the corresponding server ID. Preferably, the DHCP REQUEST message 212 is broadcast.

In response, the DHCP server 30 transmits a DHCP ACK (=ACKNOWLEDGE) message 213 to the requesting terminal 10. The transmitted DHCP ACK message 213 comprises the IP address of the terminal 10, the IP address of the call manager 40 and a port on which the call manager 40 is constantly listening, and additional relevant data.

Thus in step 214, the terminal 10 has its own IP address, the call manager's 40 IP address and the port the call manager 40 is listening on. The terminal 10 addresses the packets related to the emergency call with the destination address and port of the call manager 40 and sends the addressed packets to the call manager 40. An RTP flow 215 between the terminal 10 and the call manager 40 is established. The call manager 40 receives the packets related to the emergency call, initiates a call setup 216 to the relevant PSAP 60 and forwards the packets to the PSAP 60.

FIG. 3b shows a message flow sequence related to a packet routing based on a destination NAT. With this destination NAT method, a client can send packets to any destination address once he received an IP address. A NAT server 22 will modify this address into the one of the call manager 30. The steps 220 to 224 of FIG. 3b correspond to the steps 210 to 214 shown in FIG. 3a. The only difference with respect to the method illustrated in FIG. 3a is that the DHCP OFFER message 221 and the DHCP ACK message 223 do not comprise the IP address and the port of the call manager 40.

It is also possible that the terminal 10 receives an IP address for joining the LAN 3 via another method than via DHCP.

In step 224, the terminal 10 retrieves its IP address, only. The terminal 10 addresses the packets related to the emergency call with any IP address as destination address and sends the addressed packets to the NAT server 22 associated with the AP 20. An RTP flow 225 between the terminal 10 and the NAT server 22 is established. The NAT server 22 receives the packets from the terminal 10 and translates the destination address to the IP address of the call manager 40. An RTP flow 226 between the NAT server 22 and the call manager 40 is established. The call manager 40 receives the information related to the emergency call in packet form or stream form, initiates a call setup 227 to the relevant PSAP 60 and forwards the packets to the PSAP 60.

FIG. 3c shows a message flow sequence related to a packet routing based on a multicast method. With this multicast method, a client—once he received an IP address—sends packets to a well-known multicast address on a predefined port on which the call manager 40 is listening. The steps 230 to 234 of FIG. 3c correspond to the steps 210 to 214 shown in FIG. 3a. The only difference with respect to the method illustrated in FIG. 3a is that the DHCP OFFER message 231 and the DHCP ACK message 233 do not comprise the IP address and the port of the call manager 40.

It is also possible that the terminal 10 receives an IP address for joining the LAN 3 via another method than via DHCP.

In step 234, the terminal 10 retrieves its IP address, only. The terminal 10 addresses the packets related to the emergency call with a multicast IP address as destination address and sends the addressed packets to the call manager 40. An RTP flow 235 between the terminal 10 and the call manager 40 is established. The call manager 40 receives the information (packet/stream form) related to the emergency call, initiates a call setup 236 to the relevant PSAP 60 and forwards the packets to the PSAP 60.

Figure 4:
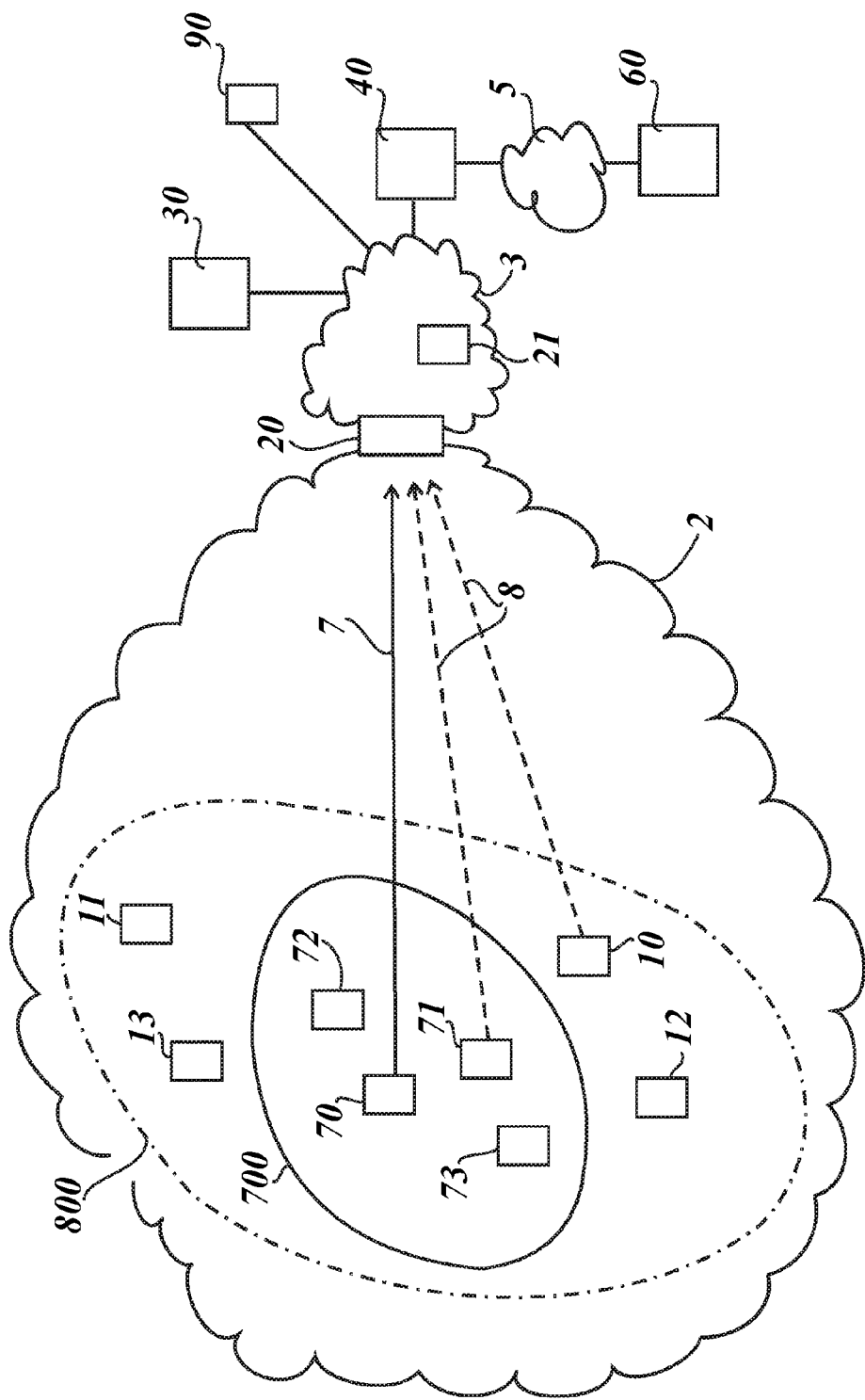
FIG. 4 is a block diagram of terminals accessing a LAN according to another embodiment of the invention.

FIG. 4 shows a group 700 of authorized users of the WLAN 2 comprising the terminals 70 to 73. The group 700 of authorized users is able to access the LAN 3 with a non-emergency call by using a first SSID 7. At the same time, the members of the group 700 are also members of an open group 800. The open group 800 both comprises the authorized users with the terminals 70 to 73 and the non-authorized users of the WLAN 2 with the terminals 10 to 13. Only the group 700 of authorized users is entitled to access the LAN 3 with a non-emergency call by using a first SSID 7. However, both the members of the group 700 and the members of the group 800 are enabled to access the LAN 3 with an emergency call by using an emergency SSID 8 since the group 800 is located in the coverage area of the access point 20. Any terminal of the group 700 or the group 800 may access the LAN 3 via the access point 20 using the emergency SSID 8, e.g., the terminal 10 or the terminal 71.

Therefore, any terminal in the coverage area of the access point 20 may access the LAN 3 in the case of an emergency by using the emergency SSID 8. In the case of a non-emergency call, only terminals of the authorized group 700 comprising authorized users of the WLAN 2 may access the LAN 3 via the access point 20. While calls associated with the emergency SSID 8 will be routed to the PSAP 60, a non-emergency call, e.g., originating from the terminal 70, may be routed to another communication partner 90 in a procedure as known from the prior art.

In order to enforce access control, the access control function 21 may—in addition to restricting access to the LAN 3 to data packets from a terminal associated with an authorized SSID—apply additional rules to the arriving data packets. It is possible that each user sending data packets from a terminal associated with an emergency SSID to the LAN 2 may be allocated a limited bandwidth which is sufficient to set up the emergency call to the PSAP 60 but is not wide enough to establish other calls. This access control mechanism may work since an emergency call may be rather restricted concerning the amount of data.

Closely related to this access control mechanism is the technique to admit only voice traffic to the LAN 3. Thus, data packets related to bandwidth-consuming applications like video are barred from the LAN 3 if the data packets try to enter the LAN 3 by using a an emergency SSID.

Figure 5:
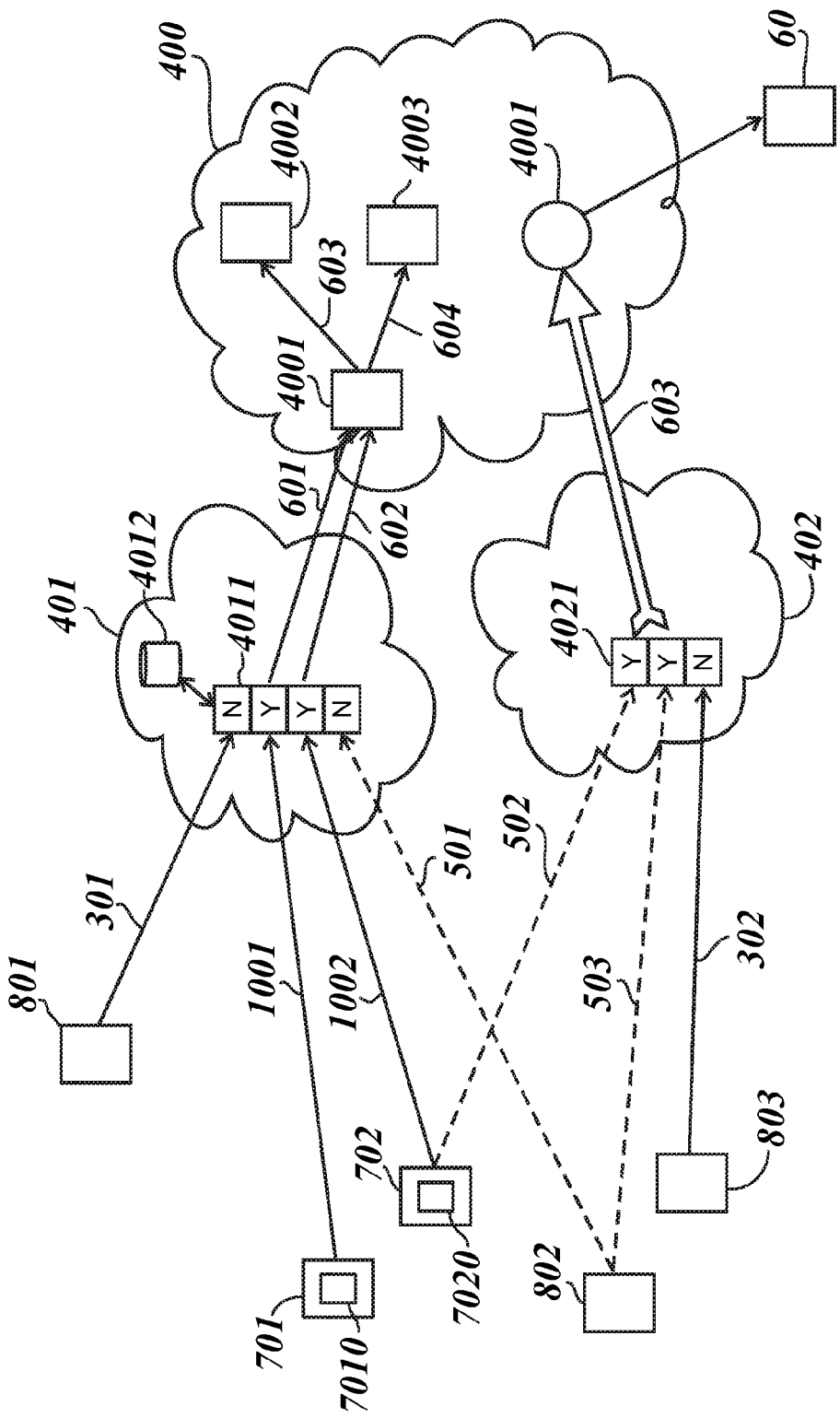
FIG. 5 is another block diagram of terminals accessing a LAN according to still another embodiment of the invention.

FIG. 5 shows a network 400 for transmission of IP packets and two wireless access networks 401, 402 for providing access to the network 400. The corporate access network 401 is a corporate access network only accessible by authorized user terminals 701, 702, whereas the emergency access network 402 is accessible for emergency purposes by any mobile user terminal within the service area of the emergency access network 402, i.e., both by the authorized user terminals 701, 702 and guest user terminals 801 to 803.

The authorized terminals 701, 702 may comprise encryption modules 7010, 7020 enabling the terminals 701, 702 to properly encrypt data packets before transmitting them to the access network 4012.

Each access network 401, 402 broadcasts, by means of a sender, e.g., by means of an AP, a SSID specific to the respective access network. The corporate access network 401 broadcasts a corporate SSID associated to the corporate access network 401, and the emergency access network 402 broadcasts an emergency SSID associated to the emergency access network 401. The broadcast SSIDs can be received by any terminal in the coverage area of the access networks 401, 402.

The corporate access network 401 comprises an access control function 4011, and similarly, the emergency access network 402 comprises an access control function 4021. The access control functions 4011, 4021 are implemented as stand-alone servers comprising access control rules stored in a memory module. Each of the access control functions 4011, 4021 filters arriving data packets before admitting them to the access networks 401, 402.

Data packets from a terminal associated with the emergency SSID associated to the emergency access network 402 are granted access by the access control function 4021 to the emergency access network 402. The authorized user terminals 701, 702, only, may be able to properly encrypt data packets by means of the encryption modules 7010, 7020. Data packets arriving at the access control function 4011 must originate from a terminal associated with the corporate SSID associated to the corporate access network 401 and may be properly encrypted to be admitted to the access network 401. By means of an encryption technique, the access control function 4011 filters the arriving data packets and discards data packets which do not originate from the authorized user terminals. The access control function 4011 retrieves data relevant for the filtering and examination process from a data base 4012.

The guest user terminal 801 has taken notice of the corporate SSID and uses the corporate SSID to access the corporate access network 401. It is possible that a network administrator of the corporate access network 401 configures a public corporate SSID that is set on an access point of the corporate access network 401 and broadcast to all wireless devices in range. Thus, the corporate SSID has been openly broadcast by the corporate access network 401 and the guest user terminal 801 has received the corporate SSID by picking up the broadcast corporate SSID.

However, it is also possible that the guest user terminal 801 is associated with an eavesdropper who wants to use the communications services offered by the corporate access network 401 in an unauthorized manner. Let us imagine that the network administrator of the corporate access network 401 has disabled the automatic SSID broadcast feature in an attempt to improve network security as the public broadcast of the corporate SSID may pose a security risk. However, the protection offered by the deactivation of a SSID broadcast may be easily circumvented by the eavesdropper as the SSID can be sniffed in plain text from a data packet sent by an authorized terminal 701, 702 to the corporate access network 401.

However, the guest user terminal 801 has received the corporate SSID, associates with the corporate SSID and sends a data packet stream 301 to the corporate access network 401. As the guest user terminal 801 has no means to properly encrypt the data packets 301, the examination carried out by the access control function 4011 on the data packet stream 301 results in a rejection of the data packet stream 301.

On the other hand, the authorized user terminal 701 comprising the encryption module 7010 sends data packets 1001 to the corporate access network 401 which both are from a terminal associated with the corporate SSID and are properly encrypted. Thus, the examination process at the access control function 4011 results in admission to the access network. Likewise, the data packets 1002 originating from the other authorized user terminal 702 also are admitted to the corporate access network 401.

When the authorized user terminal 702 sends data packets 502 from a terminal associated with the emergency SSID to the access control function 4021, the data packets 502 are admitted to the emergency access network 402. The guest user terminal 802 sends a data packet stream 501 related to the emergency SSID to the corporate access network 401 but is not admitted to the corporate access network 401 since the data packet stream 501 neither is from a terminal associated with the proper SSID nor is properly encrypted. However, when the guest user terminal 802 associated with the emergency SSID sends a data packet stream 502 to the emergency access network 402, the data packet stream 502 is admitted to the emergency access network 402 by the access control function 4021 since the data packets 503 are from a terminal associated with the emergency SSID.

When the guest user terminal 803 associated with the corporate SSID sends data packets 302 to the emergency access network 402, the data packet stream 302 is rejected by the access control function 4021. The access control function 4021 only admits data packets from a terminal associated with the emergency SSID.

After entering the corporate access network 401, the data streams 1001 and 1002 are forwarded as data streams 601 and 602 to the network 400 and routed to a network element 4001, e.g., a router or a switch, which routes or switches the data streams 601 and 602 according to the IP destination addresses indicated in the data packets of the data streams 601 and 602.

For example, when the user of the authorized user terminal 701 dials the VoIP telephone number of a corporate communication partner, a VoIP user agent of the authorized user terminal 701 correspondingly addresses the data packets 1001, 601 with the corresponding address, and the data packets stream 601 is routed by the network element 4001 to another network element 4002 which is responsible for the address. The establishment of a connection requires an exchange of signalling and control messages for proper routing and call establishment. Likewise, the data packets 1002 are routed via the network element 4002 to another network element 4003. There is no pre-established routing, instead each next hop in the network 400 is determined by each network element individually for every data packet according to the indicated address of a data packet.

On the other hand, the data streams 502, 503 arriving at and admitted to the emergency access network 402 are routed to a call manager 4001, e.g., a PBX, which routes the data packets to an emergency service answering point 60, e.g., a PASP (PBX=Private Branch Exchange). The routing is executed on a pre-established connection without the need for any signalling and controlling traffic.

It is also possible that, irrespectively of the actual address of the data packets, the original destination address of the data packets admitted to the emergency access network 402 may be stripped off the data packets and substituted with a pre-set standard address associated with the emergency service, e.g., an IP address and port of the call manager 4001. By this standardized and pre-established approach, a fast and reliable answering of emergency calls is possible.

FIGS. 6*a* to 6*d* show four different examples related to the localization of a terminal initiating an emergency call. In each of the FIGS. 6*a* to 6*d*, a sequence of messages is transmitted between the terminal 10, the access point 20 of the LAN 3, the DHCP server 30, a localization server 35, the call manager 40, and the PSAP 60. The localization server 35 hosts web services providing the transmission of localization information to the PSAP.

Figure 6A:
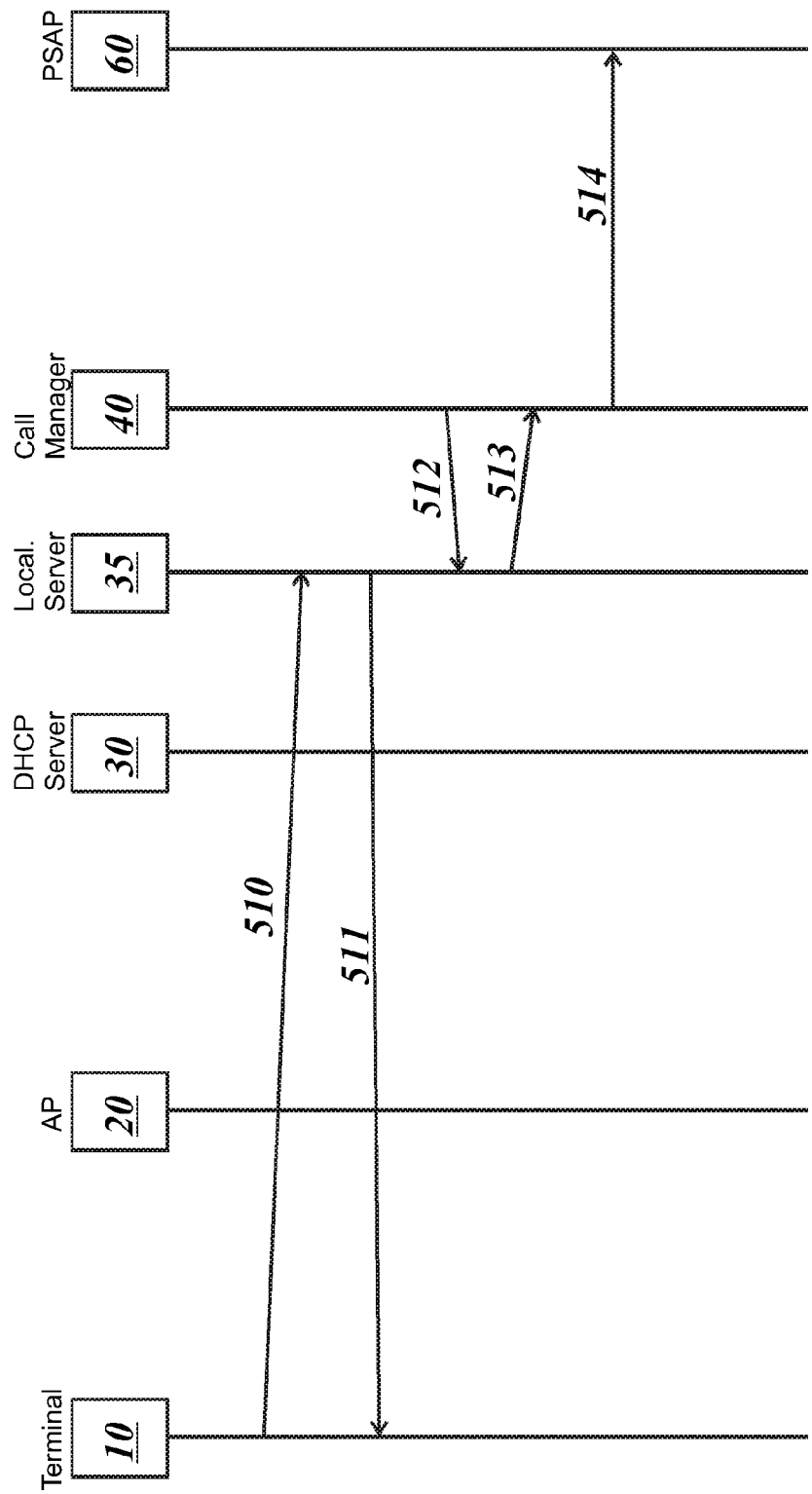
FIGS. 6a-d are message flow sequences showing localization related options according to an embodiment of the invention.

FIG. 6*a* shows a message flow sequence related to the localization of the terminal 10 according to a first alternative. In a first step of the method, the terminal 10, after association to an emergency SSID, sends a SOAP push message 510 via the AP 20 to the localization server 35. The SOAP push message 510 comprises localization information of the terminal 10, e.g., a BSSID of the AP 10 via which the terminal has access to the LAN (BSSID=Basic Service Set Identifier). The BSSID is a unique identifier of an AP in a LAN. The IEEE 802.11-1999 Wireless LAN specification defines a BSSID as a MAC address identifying a station (STA) of an AP in infrastructure mode. Thus, the BSSID uniquely identifies each AP, which is indispensable for distinguishing APs with identical SSID.

The localization server 35 responds by a reply 511 which acts as an acknowledgment of the request 510. If the terminal 10 receives no reply within a certain period of time after sending the SOAP request message 510, the terminal 10 can re-send the SOAP request message 510.

As soon as the call manager 40 notices an emergency call, the call manager starts to regularly poll the localization server 35 by sending a polling message 512 to the localization server 35. The polling message 512 triggers the localization server 35 to report to the call manager 40 any update information relating the localization information of the terminal 10. The localization server 35 always responds with localization information. The localization server 35 responds to the polling message 512 by sending a reply 513. The reply 513 comprises either update information regarding the location of the terminal or simply an indication that no update information is available. The call manager 40 will simply forward the retrieved localization information as message 514 to the PSAP 60 or will process the retrieved localization information and then send the processed localization information as message 514 to the PSAP 60.

For example, the localization server 35 may translate the AP BSSID of the localization information to geographic coordinates, e.g., by means of a data base comprising the BSSIDs and corresponding locations of the APs of the LAN. The call manager will then send the geographic coordinates to the PSAP 60 where assistance may be sent to the indicated geographic location.

Figure 6B:
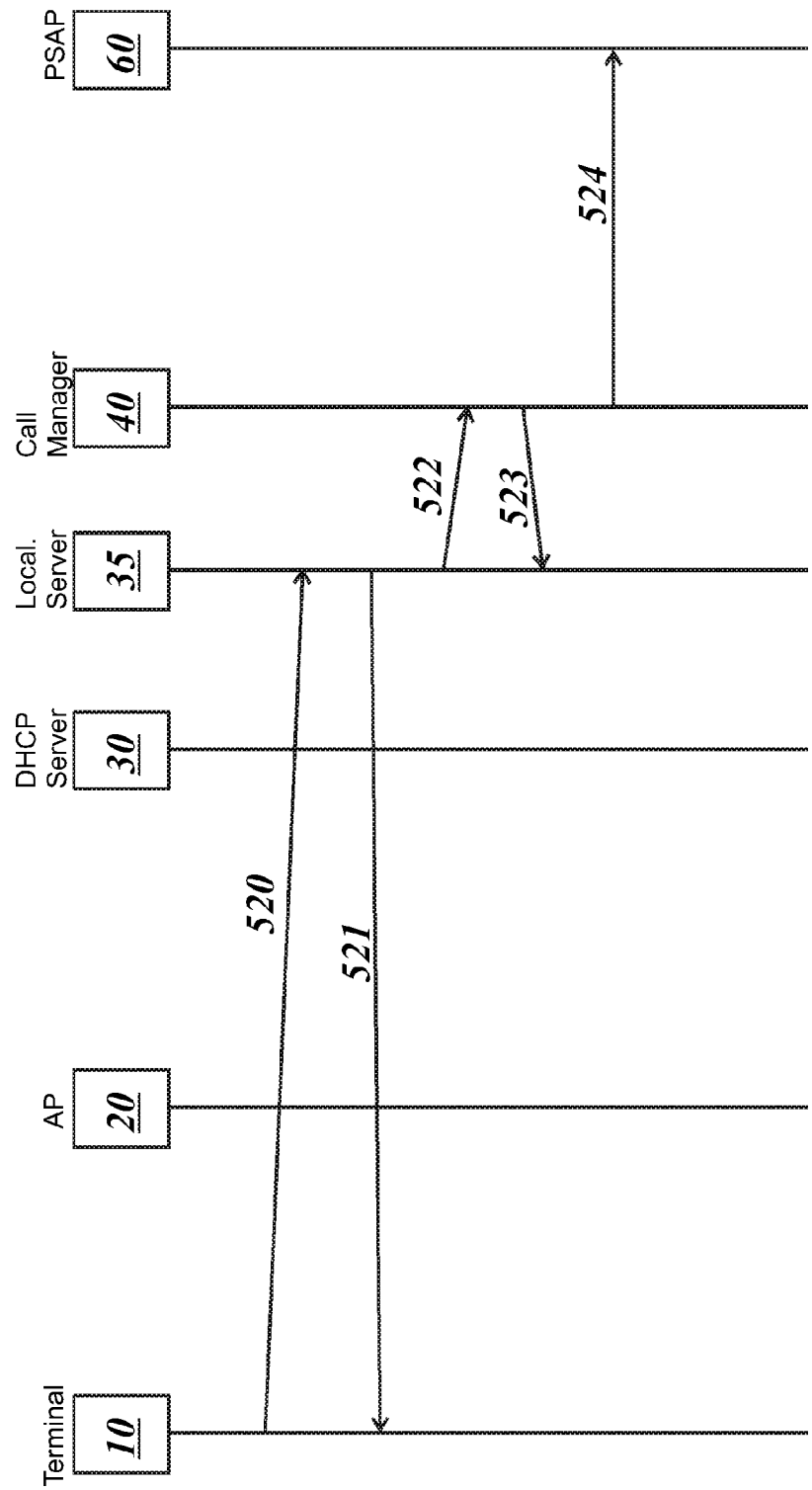

FIG. 6*b* shows a message flow sequence related to the localization of the terminal 10 according to a second alternative. The steps 520 to 521 correspond to the steps 510 to 511 described with reference to FIG. 6*a*. The corresponding description given above also applies to FIG. 6*b*.

After the localization server 35 has received the localization information or an update of the localization information from the terminal 10 and, preferably, has sent a reply 521 to the terminal 10, the localization server 35 pushes the localization information to the call manager 40 by means of message 522. In response to the message 522, the call manager 40 sends a reply message 523 for acknowledgment to the localization server 35.

The call manager 40 will simply forward the retrieved localization information to the PSAP 60 as message 524 or will process the retrieved localization information and then send processed localization information as message 524 to the PSAP 60, as described above with reference to FIG. 6*a*.

Figure 6C:
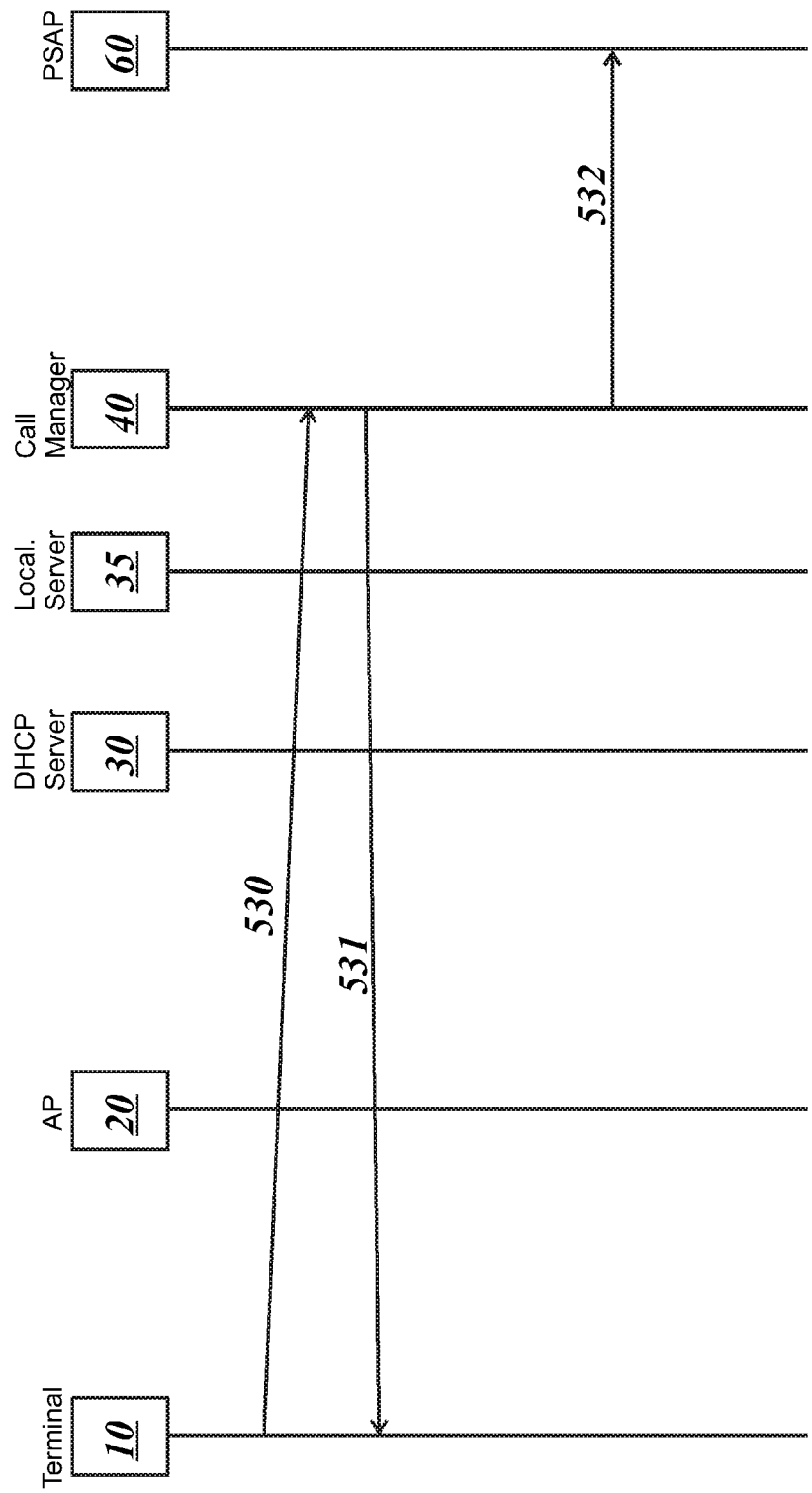

FIG. 6*c* shows a message flow sequence related to the localization of the terminal 10 according to a third alternative. In a first step of the method, the terminal 10, after association to an emergency SSID, sends a SOAP request message 530 via the AP 20 to the call manager 40. The SOAP request message 510 comprises localization information of the terminal 10, e.g., a BSSID of the AP 10 via which the terminal has access to the LAN.

The call manager 40 responds by a reply 531 which acts as an acknowledgment of the request 530. If the terminal 10 receives no reply within a certain period of time after sending the SOAP request message 530, the terminal 10 can re-send the SOAP request message 530 to the call manager 40.

After the call manager 40 has received the localization information or an update of the localization information from the terminal 10 and, preferably, has sent a reply 531 to the terminal 10, the call manager 40 will simply forward the retrieved localization information as message 532 to the PSAP 60 or will process the retrieved localization information and then send the processed localization information as message 532 to the PSAP 60, as described above with reference to FIG. 6*a*.

Figure 6D:
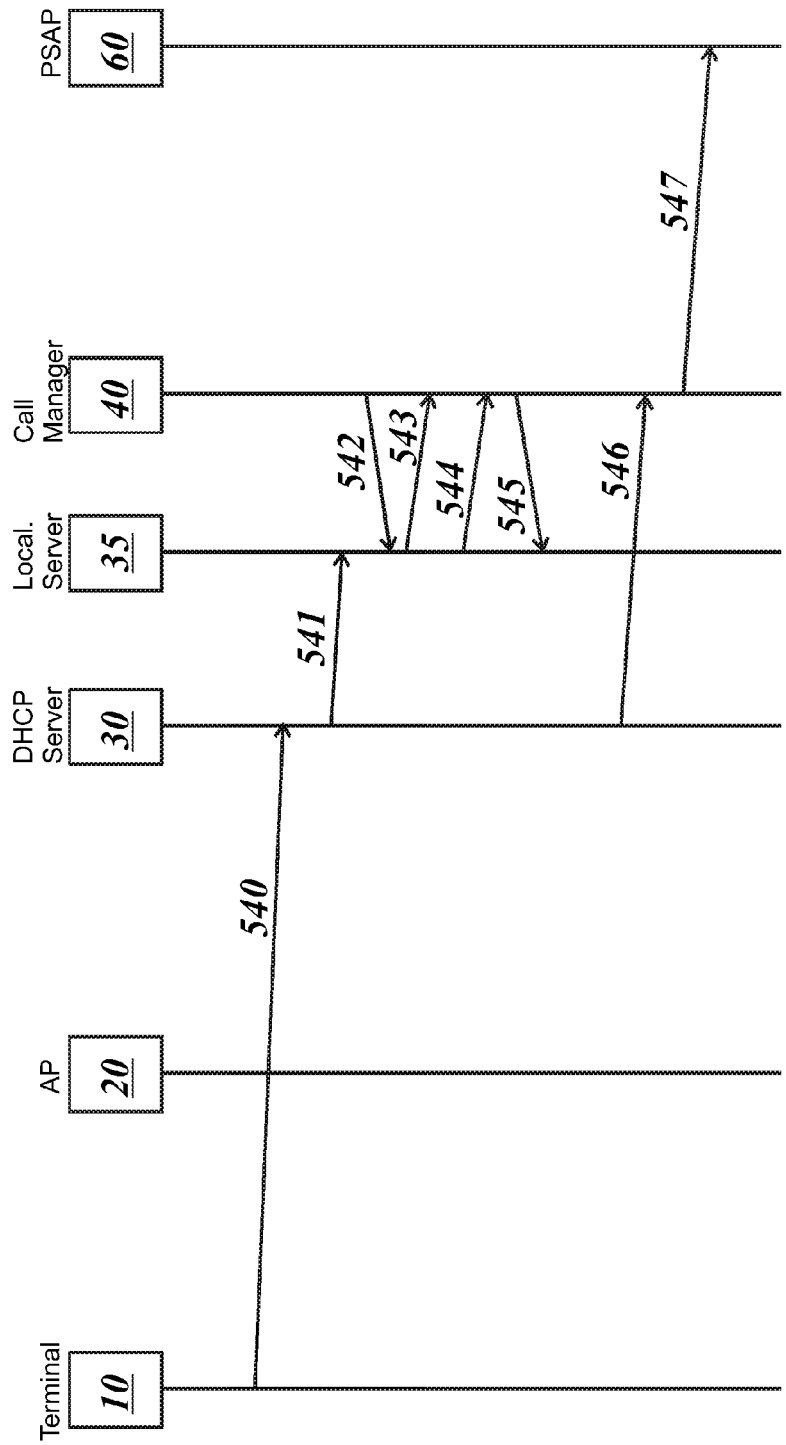

FIG. 6*d* shows a message flow sequence related to the localization of the terminal 10 according to a fourth alternative. In a first step of the method, the terminal 10, after association to an emergency SSID, sends a DHCP renew request 540 to the DHCP server 30. The DHCP renew request 540 comprises localization information of the terminal 10, e.g., a BSSID of the AP 10 via which the terminal has access to the LAN.

For the further proceeding, we have two options. The DHCP server 30 either sends a SOAP message 541 to the localization server 35 or sends a SOAP message 546 to the call manager 40.

In the first case, the localization information may be transmitted to the call manager 40 either by a, preferably regular, polling message 542 from the call manager and corresponding reply 543 from the localization server 35, as described above, or by pushing the localization information by means of a message 544 from the localization server 35 to the call manager 40 as soon as the localization server 35 has received the SOAP message 541. Again, the call manager 40 may respond to the message 544 with a acknowledgment reply 545.

After the call manager 40 has received the localization information from the localization server 35, the call manager 40 will simply forward the retrieved localization information as message 547 to the PSAP 60 or will process the retrieved localization information and then send the processed localization information as message 547 to the PSAP 60, as described above with reference to FIG. 6*a*.

In the latter case where the DHCP server 30 sends the SOAP message 546 directly to the call manager 40, the call manager 40 will again forward the retrieved original localization information or a processed localization information as message 547 to the PSAP 60.

The described method alternatives and options may be executed in any possible combination. Thus, the steps described with regard to a single method alternative may be combined with steps of another method alternative to achieve the goal of the invention. For example, the claims 1, 8, 10, and 13 may be combined with each other.

The invention claimed is:

1. A method of providing a terminal with an emergency access over a WLAN to a LAN comprising one or more access points and an access control function which admits data packets from users of the WLAN associated with a first SSID to the LAN, whereby the method comprises the steps of:
    defining one or more emergency SSIDs dedicated to allow access to the LAN in an emergency case;
    initiating an emergency call by sending data packets from a terminal associated with a selected emergency SSID to one of the one or more access points;
    admitting, by the access control function, the data packets from the terminal associated with the selected emergency SSID to the LAN; and
    routing the data packets associated with the selected emergency SSID, after admission to the LAN, to an emergency answering point.

2. The method of claim 1,
wherein the method comprises the further step of:
    sending the data packets from the terminal associated with the selected emergency SSID to a destination address received from a DHCP request.

3. The method of claim 2,
wherein the method comprises the further step of:
    requesting, by the terminal, a particular DHCP option that will provide the terminal with an IP address of the call manager;
    receiving, by the terminal, the IP address of the call manager and a port the call manager is listening on by means of DHCP; and
    addressing data packets at the terminal associated with the selected emergency SSID with the received IP address of the call manager and the port the call manager is listening on.

4. The method of claim 1,
wherein the method comprises the further step of:
    redirecting the data packets from the terminal associated with the selected emergency SSID in the LAN infrastructure to a predetermined destination address by using a NAT function.

5. The method of claim 4,
wherein the method comprises the further step of:
    sending the data packets from the terminal associated with the selected emergency SSID to an arbitrary IP address; and
    modifying the arbitrary IP address of the data packets from the terminal associated with the selected emergency SSID at a NAT server in the LAN infrastructure to the destination address of a call manager.

6. The method of claim 1,
wherein the method comprises the further step of:
    addressing and/or redirecting the data packets from the terminal associated with the selected emergency SSID to an IP address of a call manager whereby said IP address is a multicast address.

7. The method of claim 6,
wherein the method comprises the further step of:
    addressing data packets at the terminal associated with the selected emergency SSID with a predefined multicast address on a predefined port on which the call manager is listening; and
    sending the data packets from the terminal associated with the selected emergency SSID to the predefined multicast address.

8. A method of providing a terminal with an emergency access over a WLAN to a LAN comprising one or more access points and an access control function which admits data packets from users of the WLAN associated with a first SSID to the LAN, whereby the method comprises the steps of:
    defining one or more emergency SSIDs dedicated to allow access to the LAN in an emergency case;
    initiating an emergency call by sending data packets from a terminal associated with a selected emergency SSID to one of the one or more access points;
    admitting, by the access control function, the data packets from the terminal associated with the selected emergency SSID to the LAN; and
    constantly listening, by the call manager, for an emergency request on an emergency-specific port.

9. The method of claim 8,
wherein the method comprises the further step of:
    routing the data packets related to the emergency call to an emergency answering point and thereby transmitting RTP packets independently of a specific signaling scheme without coding or decoding and without framing negotiation.

10. A method of providing a terminal with an emergency access over a WLAN to a LAN comprising one or more access points and an access control function which admits data packets from users of the WLAN associated with a first SSID to the LAN, whereby the method comprises the steps of:
- defining one or more emergency SSIDs dedicated to allow access to the LAN in an emergency case;
- initiating an emergency call by sending data packets from a terminal associated with a selected emergency SSID to one of the one or more access points;
- admitting, by the access control function, the data packets associated with the selected emergency SSID to the LAN; and
- restricting the access to the LAN to data packets from the terminal associated with the selected emergency SSID with regard to service and/or bandwidth and/or destination.

11. The method of claim 10,
wherein the method comprises the further steps of:
restricting the access to the LAN by applying firewall rules and/or by the use of an access control list and/or by defining one or more virtual local area networks.

12. The method of claim 10,
wherein the method comprises the further steps of:
restricting the access to the LAN by setting a bandwidth contract to each terminal requesting the emergency service and/or by admitting only voice traffic.

13. A method of localizing a terminal with an emergency access over a WLAN to a LAN comprising one or more access points and an access control function which admits data packets from users of the WLAN carrying a first SSID to the LAN,
whereby the method comprises the steps of:
defining one or more emergency SSIDs dedicated to allow access to the LAN in an emergency case;
initiating an emergency call by sending data packets from a terminal associated with a selected emergency SSID to one of the one or more access points;
admitting, by the access control function, the data packets from the terminal associated with the selected emergency SSID to the LAN; and
transmitting localization information about the location of the terminal to a call manager.

14. The method of claim 13,
wherein the method comprises the further step of:
sending, by the terminal, a SOAP message with the localization information to a localization server or the call manager;
if the SOAP message with the localization information is sent to the localization server, polling, by the call manager, the localization server to retrieve the localization information or pushing, by the localization server, the localization information to the call manager after receiving the localization information from the terminal.

15. The method of claim 13,
wherein the method comprises the further step of:
sending, by the terminal, a DHCP renew message with the localization information to a DHCP server;
sending, by the DHCP server, a SOAP message with the localization information to the localization server or the call manager;
if the SOAP message with the localization information is sent to the localization server, polling, by the call manager, the localization server to retrieve the localization information or pushing, by the localization server, the localization information to the call manager after receiving the localization information from the terminal.

16. The method of claim 13,
wherein the method comprises the further steps of:
associating two or more of the emergency SSIDs with different capabilities, preferably with different codecs; and
selecting an emergency SSID based on information extracted from the broadcast of one or more emergency SSIDs.

17. The method of claim 13,
wherein the method comprises the further step of:
prioritizing the emergency call by using a traffic specification procedure or a preemption procedure.

18. The method of claim 13,
wherein the method comprises the further steps of:
broadcasting the one or more emergency SSIDs from at least one of the one or more access points;
detecting, by the terminal, at least one of the one or more broadcast emergency SSIDs;
selecting an emergency SSID from the at least one detected emergency SSID; and
associating, by the terminal, to the selected emergency SSID.

19. The method of claim 13,
wherein the method comprises the further step of:
outputting, after detecting the at least one of the one or more emergency SSIDs, a notification at the terminal to inform a user of the terminal that an emergency access to the WLAN is available.

20. The method of claim 13,
wherein the method comprises the further step of:
receiving by the terminal an IP address by means of DHCP.

21. A communication system for providing a terminal with an emergency access over a WLAN to a LAN, the communication system comprising an access control function which admits data packets from users of the WLAN associated with a first SSID to the LAN, wherein the communication system comprises an interface adapted to receive data packets from a terminal associated with an emergency SSID selected from the at least one detected emergency SSID, a control unit adapted to forward the data packets received from the terminal associated with the selected emergency SSID to the access control function, whereby the access control function admits the data packets from the terminal associated with the selected emergency SSID to the LAN, and wherein the communication system is adapted to route the data packets from the terminal associated with the selected emergency SSID, after admission to the LAN, to an emergency answering point.

22. The communication system of claim 21,
wherein the communication system is further adapted to route the data packets from the terminal associated with the selected emergency SSID whereby said data packets carry a destination address received at the terminal from the communication system by means of a DHCP request.

23. The communication system of claim 21,
wherein the communication system further comprises a NAT function adapted to redirect the data packets from the terminal associated with the selected emergency SSID in the LAN infrastructure to a predetermined destination address.

24. The communication system of claim 21,
wherein the communication system is further adapted to route the data packets from the terminal associated with the selected emergency SSID whereby said data packets carry as destination address an IP address of a call manager and said IP address is a multicast address.

25. A communication system for providing a terminal with an emergency access over a WLAN to a LAN, the communication system comprising an access control function which admits data packets from users of the WLAN associated with a first SSID to the LAN, wherein the communication system comprises an interface adapted to receive data packets from a terminal associated with an emergency SSID selected from the at least one detected emergency SSID, a control unit adapted to forward the data packets received from the terminal associated with the selected emergency SSID to the access control function, whereby the access control function admits the data packets from the terminal associated with the selected emergency SSID to the LAN, and a call manager adapted to constantly listen for an emergency request on an emergency-specific port.

26. A communication system for providing a terminal with an emergency access over a WLAN to a LAN, the communication system comprising an access control function which admits data packets from users of the WLAN associated with a first SSID to the LAN, wherein the communication system comprises an interface adapted to receive data packets from a terminal associated with an emergency SSID selected from the at least one detected emergency SSID, a control unit adapted to forward the data packets received from the terminal associated with the selected emergency SSID to the access control function, whereby the access control function admits the data packets from the terminal associated with the selected emergency SSID to the LAN, and wherein the access control function is adapted to restrict the access to the LAN to data packets from the terminal associated with the selected emergency SSID with regard to service and/or bandwidth and/or destination.

27. A communication system for localizing a terminal with an emergency access over a WLAN to a LAN, the communication system comprising an access control function which admits data packets from users of the WLAN associated with a first SSID to the LAN, wherein the communication system comprises an interface adapted to receive data packets from a terminal associated with an emergency SSID selected from the at least one detected emergency SSID, a control unit adapted to forward the data packets received from the terminal associated with the selected emergency SSID to the access control function, whereby the access control function admits the data packets from the terminal associated with the selected emergency SSID to the LAN, and a localization server and/or a call manager adapted to receive localization information of the terminal and forward data related to the localization information to an emergency answering point.

28. A communication system of claim 21,
wherein the communication system further comprises a sender adapted to broadcast one or more emergency SSIDs dedicated to allow access to the LAN in an emergency case to the terminal.

\* \* \* \* \*